J. BUSSER.
Hand-Car Propelling Mechanisms.

No. 156,628. Patented Nov. 10, 1874.

Witnesses.
D. R. Cowl
Edmund Masson

Inventor.
Jacob Busser,
By atty A. B. Stoughton.

UNITED STATES PATENT OFFICE.

JACOB BUSSER, OF PHILADELPHIA, PENNSYLVANIA.

IMPROVEMENT IN HAND-CAR-PROPELLING MECHANISMS.

Specification forming part of Letters Patent No. 156,628, dated November 10, 1874; application filed October 5, 1874.

*To all whom it may concern:*

Be it known that I, JACOB BUSSER, of the city of Philadelphia and State of Pennsylvania, have invented certain new and useful Improvements in Hand-Car-Propelling Mechanism; and that the following is a full, clear, and exact description of the same, reference being had to the accompanying drawings, making a part of this specification, in which—

Figure 1:
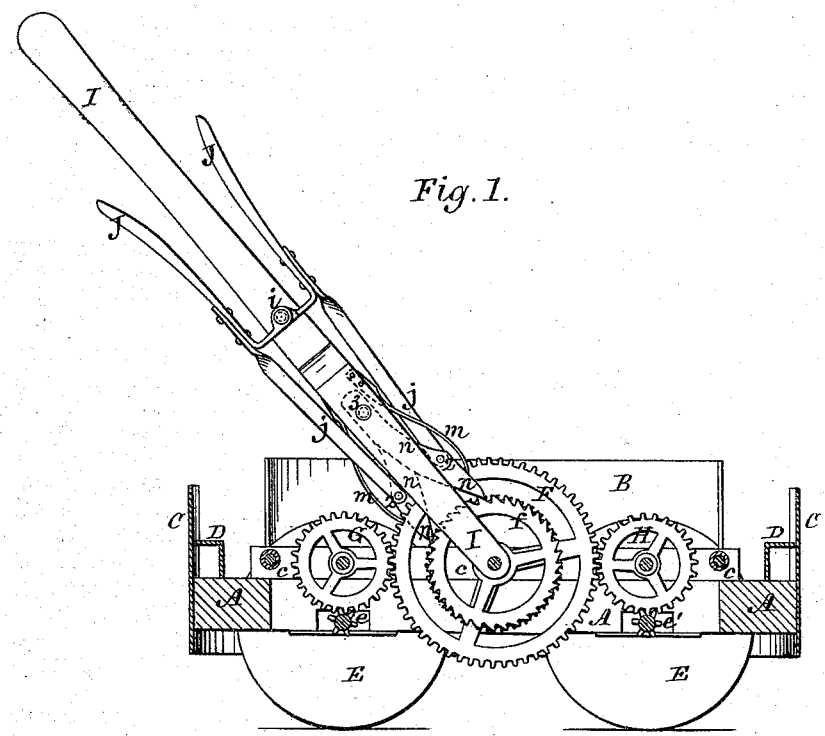
Figure 2:
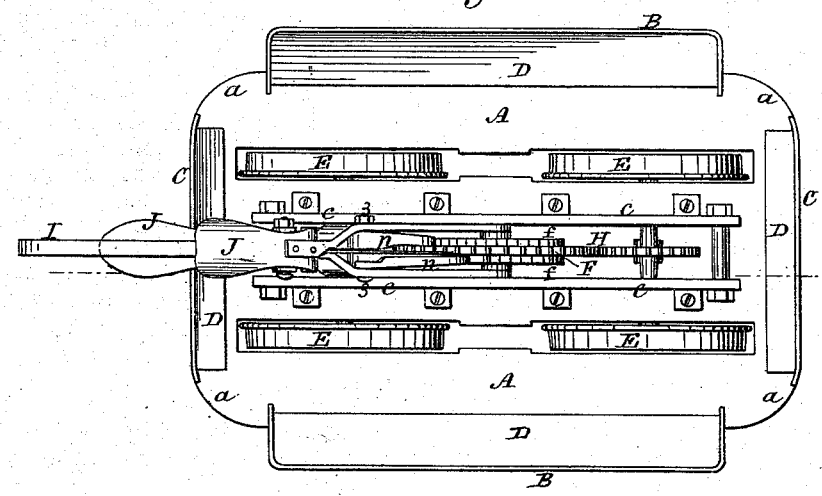

Figure 1 represents a longitudinal vertical section through a hand-car, showing the driving or propelling mechanism in elevation. Fig. 2 represents a top plan of the car and of the propelling mechanism for driving the car.

My invention relates to what are known as hand-cars, and upon which the operator rides, and, by means of a vibrating lever, spring-pawls, ratchet-wheels, and a system of cog-gears, propels the car in either direction, as may be required; and my invention consists in combining, with the ratchet-wheels and cogged gears by which motion is communicated to the supporting-wheels of the car, the pivoted hand-lever, grasp-levers, and spring-pawls, so that the operator may, at pleasure, while he works the main driving-lever, throw out or let into action either of the spring-pawls by means of the grasp-levers, and as the direction in which the car is to be propelled may require.

To enable others skilled in the art to make and use my invention, I will proceed to describe the same with reference to the drawings.

The car-frame is represented at A, upon which are side and end pieces B C, to form a body, and seats D, to accommodate the riders; and at the corners of the car or car-frame are left openings a, for easy ingress and egress. The car body or frame is supported and carried on the wheels E in the usual well-known way. Upon the car-frame, or upon an independent frame, c, fastened to the car-frame, is arranged the cogged gears F G H, the one, F, being the main driving, and the others, G H, the driven, gears, which, in turn, gear into the pinions e e', respectively, upon the axles of the supporting and driving wheels E, and cause said axles and wheels to turn, and so move the car along.

On each side of the main driving-gear F there is fastened a ratchet, f, which differ only in the direction in which their teeth incline or project, viz., in opposite directions; and both of these ratchets turn with the main drive-wheel F, one only, however, being active in the propulsion of the car at one time. Upon the shaft, journal, or axis of the combined ratchet and driving gear is pivoted a forked or branched hand-lever, I, extending up into the car, and in easy working position for the operator, who rides in the car. To this hand-lever I, as at i, are pivoted or hinged the two grasp-levers, J J, and to each of these grasp-levers is connected a rod or bar, j, the lower end of which is pivoted or otherwise connected, as at 2, to one of the spring-pawls n, of which there are two, and both pivoted in the fork or branched portion of the hand-lever I, as at 3. These pawls are held to their respective ratchets by means of the springs m.

The grasp-levers J are so arranged in relation to the main driving-lever I as that the operator can, at one and the same time, hold in his hand and grasp one of said levers J and the main lever I, thus holding out of action the pawl connected with that grasp-lever, and, by vibrating the lever I, drive the car in one direction. If it is desirable to propel the car in the opposite direction, the operator releases from his grasp the lever J that he previously held, and takes the opposite one, thus throwing out one pawl, and allowing the other one to come into action. The vibration of the hand-lever then will propel the car in an opposite direction; and so the operator, by catching in his grasp and holding pressed to the hand-lever I either of the grasp-levers J, may run the car in either direction he may choose.

I would state that driving-gears operated by a lever for propelling hand-cars are common and well known, and I lay no claim to them; but

Having thus fully described my invention, what I claim, and desire to secure by Letters Patent, is—

The combination of the driving-gears F G H and ratchets f f with the hand-lever I, grasp-levers J, and spring-pawls n n, pivoted to said lever I, as and for the purpose set forth.

JACOB BUSSER.

Witnesses:
 W. P. HIBBARD,
 OLIVER E. WOODS.